SOUND REPRODUCER WITH MEANS FOR ATTACHMENT TO A TELEPHONE HANDPIECE

Filed Aug. 29, 1963

INVENTOR.
ROBERT J. COOKE
BY Brisken & Goldfarb
ATTORNEYS

3,299,207
SOUND REPRODUCER WITH MEANS FOR ATTACHMENT TO A TELEPHONE HANDPIECE

Robert James Cooke, 50—27 213th St., Bayside, N.Y. 11364

Filed Aug. 29, 1963, Ser. No. 305,418
11 Claims. (Cl. 179—1)

This invention relates to a sound reproducer with means for attachment to a telephone handpiece and more particularly to a device adapted to be used to facilitate the transmitting of recorded programs, such as speeches, news, music, or the like, over a telephone circuit without the necessity of breaking into the line.

At the present time, various news conferences, musical programs, political conferences or national and international programs and debates such as United Nations sessions, Congressional hearings and the like are covered by reporters who have with them tape recorders or other recording instruments. These reporters, as soon as possible, rush the news to their respective publications by telephone communications and it is the object of the present invention to facilitate the transmittal of the precise news item as recorded over the telephone circuit without requiring the breaking into the telephone line.

Heretofore it has been a practice to actually interfere with the telephone structure and circuitry to connect a tape recorder directly to the telephone circuit. This is because the loud speaker of a tape recorder is generally not sufficient so as to permit a non-garbled and clear transmission of the recorded matter over the telephone circuit. The present invention facilitates the transmittal of the information by providing a physical connection between a loud speaker and the mouthpiece of a telephone handset whereby a completely clear and amplified signal of the recorded matter is provided into the telephone circuitry by clamping the device in a simple manner onto the telephone handpiece.

It is therefore an object of the invention to provide a sound reproducer for attachment to a telephone handpiece which may be easily electrically operatively connected to a tape recorder and which may be further physically connected in a simple manner overlying the mouthpiece of a telephone handpiece or handset without disturbing the structure or circuitry of the telephone.

A further object of the invention resides in the provision of a sound reproducer which is provided with means for transmitting sound in a clear and non-garbled manner directly from a loud speaker to the mouthpiece of a telephone, while serving to minimize extraneous noise which may be picked up by the telephone mouthpiece, the invention serving to physically and aurally close off the mouthpiece from extraneous sounds.

Another object of the invention resides in the provision of a sound reproducer construction wherein there is used a novel porous sound and air transmitting member from engagement with a telephone handpiece yet which member is retained within a housing and held in close proximity to a loud speaker without engaging the loud speaker so as to in any way dampen the loud speaker.

In accordance with a preferred embodiment of the present invention, the sound reproducer includes a housing having a loud speaker mounted therein. The housing is provided with a protective screen and has an opening therein through which a porous sound and air transmitting member disposed in the housing extends so as to be adapted to engage a telephone mouthpiece. The screen holds the porous member in spaced relationship to the loud speaker and the member has an inner portion of greater diameter than the opening through which the porous member extends. This porous member is preferably formed of an open cell polyurethane foam. The mounting means may be either in the form of resilient clips or straps. The housing is provided with means for relieving back pressure in the housing. A transformer for the loud speaker is mounted on the inside walls of the casing behind the loud speaker.

Still further objects and features of this invention reside in the provision of a sound reproducer for attachment to a telephone handpiece that is strong and durable, simple in construction and manufacture, capable of being made out of readily available parts and materials, and which is expensive to manufacture thereby permitting wide use and distribution.

These, together with the various ancillary objects and features of the invention which will become apparent as the following description proceeds are attained by this sound reproducer for attachment to a telephone handpiece, preferred embodiments of which have been illustrated in the accompanying drawings, by way of example only, wherein.

Figures 1, 2, 3, 4, 5:
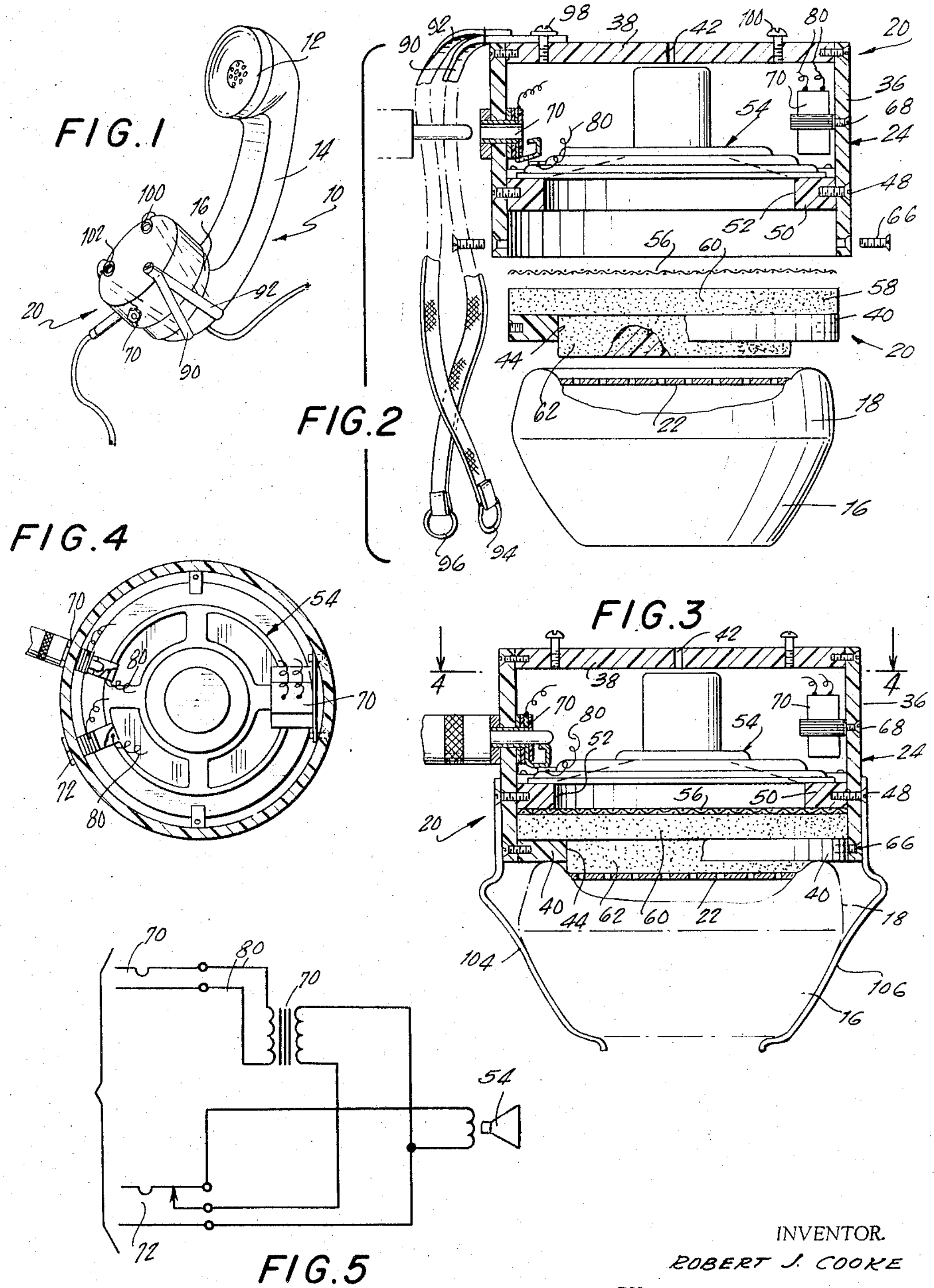
FIG. 1 is a perspective view of an embodiment of the invention shown attached to a telephone handpiece.
FIG. 2 is an exploded sectional detail view illustrating a particular construction of the sound reproducer.
FIG. 3 is a sectional detail view illustrating a modified form of the telephone handpiece as attached to the telephone handpiece.
FIG. 4 is a transverse sectional detail view taken along the plane of line 4—4 in FIG. 3.
FIG. 5 is a schematic wiring diagram of certain component parts of the invention.

With continuing reference to the accompanying drawings wherein like reference numerals designate similar parts throughout the various views, reference numeral 10 generally designates a telephone handpiece of conventional construction which has an ear piece 12, a handle 14 and a mouthpiece 16. The sound reproducer constructed in accordance with the concepts of the present invention and represented by preferred embodiments thereof is generally designated by reference numeral 20 and is shown in FIG. 1 mounted on the handpiece 10 in intimate connection with the mouthpiece 16.

As can be seen in FIG. 2 the mouthpiece 16 includes a generally cylindrical portion 18 which is threaded or otherwise detachably secured to the rest of the mouthpiece 16 and which carries a perforated plate 22 protecting the interior of the mouthpiece 16. The perforated plate 22 is designed to be engaged by portions of the sound reproducer 20 so as to assure clear and ungarbled transmission of the sound from a tape recorder or other sound recording and reproducing device so as to provide a clear and definite audible signal to the telephone circuit.

The sound reproducer 20 includes a housing 24 of any desired shape and size. Perferably, the housing 24 is of a size similar or slightly larger than the dimensions of the telephone mouthpiece 16 and this housing includes cylindrical side wall 36, an outer end wall 38 secured in any suitable manner to the cylindrical side wall 36 and an inner or front end wall 40. The rear or outer end wall 38 is provided with a relatively small pressure-relieving aperture therethrough, while the front end wall is provided with a relatively large opening 44. Secured within the cylindrical side wall 36 by means of screws 48 or by any suitable other means is a mounting plate 50 having an enlarged opening 52 therein which forms a part of a loud speaker assembly 54. The loud speaker is mounted in the housing 24 with its axis in alignment with both the aperture 42 and the opening 44. A mesh wire screen 56 is mounted within the housing 24 against the mounting plate 50.

A porous sound and air transmitting member 58 is disposed in the housing 24 and has an outer diameter approximately the same as the inner diameter of the housing at the enlarged portion 60 thereof, while a portion 62 of reduced diameter fits snugly within the opening 44 and extends outwardly of the housing and is adapted to bear against the plate 22. The end wall 40 thereby serves to hold the member 58 within the housing in relatively intimate position with respect to the loud speaker 54 and is so arranged that the portion of reduced cross-sectional size as at 62 which is about the diameter of the plate 22 extends into engagement with the plate 22 to provide an intimate and positive sound transmitting connection between the loud speaker 54 and the plate 22. Screws or like fasteners 66 may be used to hold the front wall 40 in place. The member 58 is preferably made of an open cell polyurethane foam.

A transformer 70 is mounted on the cylindrical wall 36 of the housing 24 by means of screws 68. Also mounted on the housing 24 are jacks 70 and 72 of generally conventional construction for providing electrical connections to the sound reproducer and to which conductors 80 leading from the loud speaker and the transformer are connected. Either of the two jacks 70 and 72 may be used. The jack 70 is connected to the transformer and to the loud speaker 54 and the transformer matches the voice coil impedance of the speaker 54. This jack is provided with a 500 ohm impedance. The jack 72 is normally closed circuit jack having a voice coil connected thereto and having an 8 ohm impedance, and when the plug is put in the jack the transformer circuit is opened.

Connected to the housing 24 are a plurality of straps 90 and 92 which are adapted to be detachably engaged about the telephone handpiece 10. There are loops 94 and 96 at the opposite ends of the straps 90 and 92. The straps 90 are permanently attached by fastener 98 to the housing 24, the loops 94 and 96 being engaged about suitable stops or fasteners 100 and 102. In lieu of the straps 90 and 92 suitable clips which may be 3, 4, or more in number and indicated at 104 and 106 in FIG. 3 may be employed which are formed of spring steel or like material and which are adapted to be resiliently engaged about the telephone mouthpiece 16.

In operation, a recorder may be plugged into either of the jacks 70 or 72 to adequately transmit a recorded message such as a speech of a notable, politician, or other party to provide a means to enable the utilization of telephone circuit for transmittal of an "on scene" recorded speech, conference or the like.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A sound reproducer for attachment to a telephone handpiece comprising a housing, a loud speaker mounted in said housing, a protective screen in said housing, said housing having an opening therein, and a porous sound and air transmitting member disposed in said housing and having a portion thereof extending at least into said opening and being adapted to engage a telephone mouthpiece, said screen holding said member in spaced relationship to said loud speaker.

2. A sound reproducer for attachment to a telephone handpiece comprising a housing having front end walls and a rear end wall, a loud speaker mounted in said housing, a protective relatively rigid screen in said housing, said housing having an opening therein, a porous sound and air transmitting member disposed in said housing, said member having an inner portion of greater diameter than said opening and having an outer portion of lesser diameter than said opening extending through and beyond said opening, said screen holding said member in spaced relationship to said loud speaker.

3. A sound reproducer according to claim 2 wherein said member is formed of an open cell polyurethane foam.

4. A sound reproducer according to claim 3 including means attached to said housing for removably mounting said housing on a telephone handpiece.

5. A sound reproducer for attachment to a telephone handpiece comprising a housing having front end walls and a rear end wall, a loud speaker mounted in said housing, a protective screen in said housing, said end wall having a relatively large opening therein, a porous sound and air transmitting member disposed in said housing and having a portion thereof extending at least into said opening and being adapted to engage a telephone mouthpiece, said screen holding said member in spaced relationship to said loud speaker, said rear end wall having a relatively small aperture therethrough for relieving back pressure in said housing, and means attached to said housing for removably mounting said sound reproducer on a telephone handpiece.

6. A sound reproducer for attachment to a telephone handpiece comprising a housing, a loud speaker mounted in said housing, a protective screen in said housing, said housing having a relatively large opening therein, a porous sound and air transmitting member disposed in said housing and having a portion thereof extending at least into said opening and being adapted to engage a telephone mouthpiece, said screen holding said member in spaced relationship to said loud speaker, and means attached to said housing for removably mounting said sound reproducer on a telephone handpiece.

7. A sound reproducer for attachment to a telephone handpiece comprising a housing having front end walls and a rear end wall, a loud speaker mounted in said housing, a protective screen in said housing, said end wall having a relatively large opening therein, a porous sound and air transmitting member disposed in said housing and having a portion thereof extending through and beyond said opening and being adapted to engage a telephone mouthpiece, said screen holding said member in spaced relationship to said loud speaker, said rear end wall having a relatively small aperture therethrough for relieving back pressure in said housing, jack means on said housing and connected to said loud speaker for electrically connecting said loud speaker to a signal source, and mounting means attached to said housing for removably mounting said sound reproducer on a telephone handpiece.

8. A sound reproducer according to claim 7 wherein said mounting means includes a plurality of flexible straps.

9. A sound reproducer according to claim 7 wherein said mounting means includes at least one spring pressed clip.

10. A sound reproducer for attachment to a telephone handpiece comprising a housing having front end walls and a rear end wall, a loud speaker mounted in said housing, a protective screen in said housing, said housing having a relatively large opening therein, a porous sound and air transmitting member disposed in said housing and having a portion thereof extending through and beyond said opening and being adapted to engage a telephone mouthpiece, said screw holding said member in spaced relationship to said loud speaker, jack means on said housing and connected to said loud speaker for electrically connecting said loud speaker to a signal source, and means attached to said housing for removably mounting said sound reproducer on a telephone handpiece.

11. A sound reproducer for attachment to a telephone handpiece comprising a housing having front end walls and a rear end wall, a loud speaker mounted in said housing, a protective screen in said housing, said end wall having a relatively large opening therein, a member of open cell foamed polyurethane disposed in said housing and having a portion thereof extending through and beyond said opening and being adapted to engage a telephone mouthpiece, said screen holding said member in spaced relationship to said loud speaker, a transformer mounted in said housing, said rear end wall having a relatively small aperture therethrough for relieving back pressure in said housing, jack means on said housing and connected to said loud speaker for electrically connecting said transformer and said loud speaker to a signal source, and means attached to said housing for removably mounting said sound reproducer on a telephone handpiece.

References Cited by the Examiner

UNITED STATES PATENTS

| | | | |
|---|---|---|---|
| 2,831,070 | 4/1958 | Sherwood | 179—188 |
| 3,254,159 | 5/1966 | Condict | 179—1 |

KATHLEEN H. CLAFFY, *Primary Examiner.*

R. MURRAY, *Assistant Examiner.*